(12) United States Patent
Fujita (10) Patent No.: US 11,599,054 B2
(45) Date of Patent: Mar. 7, 2023

(54) IMAGE FORMING APPARATUS, STORAGE MEDIUM, AND LIFE DETERMINATION METHOD

(71) Applicant: KONICA MINOLTA, INC., Tokyo (JP)

(72) Inventor: Yuji Fujita, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 818 days.

(21) Appl. No.: 16/449,592

(22) Filed: Jun. 24, 2019

(65) Prior Publication Data
US 2020/0004191 A1 Jan. 2, 2020

(30) Foreign Application Priority Data

Jun. 29, 2018 (JP) .............................. JP2018-123790

(51) Int. Cl.
*B65H 7/12* (2006.01)
*G03G 15/00* (2006.01)
*G01P 3/04* (2006.01)

(52) U.S. Cl.
CPC .............. *G03G 15/703* (2013.01); *G01P 3/04* (2013.01); *G03G 15/6502* (2013.01); *G03G 2215/00548* (2013.01); *G03G 2215/00746* (2013.01)

(58) Field of Classification Search
CPC ............. G03G 15/703; G03G 15/6502; G03G 2215/00548; G03G 2215/00746; G01P 3/04; B65H 7/12
See application file for complete search history.

(56) References Cited

U.S. PATENT DOCUMENTS

2016/0347563 A1\* 12/2016 Takuwa .................... B65H 3/06
2019/0023513 A1\* 1/2019 Hirano .................. B65H 3/5215

FOREIGN PATENT DOCUMENTS

JP 2000159357 A 6/2000
JP 2018100181 A 6/2018

OTHER PUBLICATIONS

Notice of Reasons for Refusal dated Mar. 29, 2022, issued by the Japanese Office Action in corresponding Japanese Patent Application No. 2018-123790; 8 pages including 5 pages of English Translation.

\* cited by examiner

*Primary Examiner* — Thomas A Morrison
(74) *Attorney, Agent, or Firm* — Buchanan Ingersoll & Rooney PC

(57) ABSTRACT

An image forming apparatus including: a sheet feeding roller which feeds a sheet accumulated on a tray; and a hardware processor which: detects a movement speed of the sheet currently fed by the sheet feeding roller; and calculates a difference amount between the movement speed and a first reference speed, and determines a life of the sheet feeding roller based on the difference amount, wherein the hardware processor determines whether or not to use the movement speed of a first sheet for life determination based on a relationship between the movement speed of the first sheet and the movement speed of a sheet fed before the first sheet, and if the hardware processor determines not to use the movement speed of the first sheet for the life determination, the hardware processor calculates the difference amount by excluding the movement speed of the first sheet.

25 Claims, 9 Drawing Sheets

| SHEET FEEDING SPEED || LIFE DETERMINATION |
|---|---|---|
| P0 | P1 | |
| LESS THAN THRESHOLD | LESS THAN THRESHOLD | EXCLUDE |
| | | EXCLUDE |
| | EQUAL TO OR MORE THAN THRESHOLD | EXCLUDE |
| | | EXCLUDE |
| EQUAL TO OR MORE THAN THRESHOLD | LESS THAN THRESHOLD | ADOPT |
| | | ADOPT |
| | EQUAL TO OR MORE THAN THRESHOLD | ADOPT |
| | | ADOPT |

| SHEET FEEDING SPEED | | LIFE DETERMINATION |
|---|---|---|
| P0 | P1 | |
| LESS THAN THRESHOLD | LESS THAN THRESHOLD | EXCLUDE |
| | | EXCLUDE |
| | EQUAL TO OR MORE THAN THRESHOLD | ADOPT |
| | | ADOPT |
| EQUAL TO OR MORE THAN THRESHOLD | LESS THAN THRESHOLD | ADOPT |
| | | ADOPT |
| | EQUAL TO OR MORE THAN THRESHOLD | ADOPT |
| | | ADOPT |

FIG.14

IMAGE FORMING APPARATUS, STORAGE MEDIUM, AND LIFE DETERMINATION METHOD

BACKGROUND

Technological Field

The present invention relates to an image forming apparatus, a storage medium, and a life determination method.

Description of the Related Art

In a conventional image forming apparatus which forms an image on sheets, the sheets are stocked in an accumulated state on a sheet feeding tray and fed one by one to an image former from the sheet feeding tray when a job is accepted.

When the sheet is conveyed onto the conveyance path from the tray, there is used a method of feeding the sheet onto the conveyance path by sending out only the uppermost sheet with a pickup roller or the like which contacts the accumulated sheet and rotates, and by nipping and conveying the sheet with a pair of rollers that is provided downstream of the sheet feeding tray and formed of a sheet feeding roller and a separating roller, the sheet feeding roller rotating in the sheet conveyance direction, and the separating roller rotating in the opposite direction to the sheet conveyance direction.

The surface of the sheet feeding roller is abraded by the friction with the sheet, and the sheet conveyance force is gradually decreased by the abrasion. When the conveyance force is lowered, the sheet feeding jam easily occurs, and thus, replacement is required when the abrasion of sheet feeding roller becomes remarkable. However, since user's downtime is large if the replacement is performed after the sheet feeding roller lost its original conveyance force, it is desirable to predict the abrasion amount of the sheet feeding roller and perform replacement at an appropriate timing before the sheet feeding roller comes to the end of its life.

With respect to such a problem, Japanese Patent Application Laid Open Publication No. 2000-159357 discloses a method of measuring the time until the arrival of sheet is detected by a sensor which is provided downstream of the tray from start of the sheet feeding, and determining that the sheet feeding roller has come to the end of its life when the average value of the times which were measured for a plurality of sheets is longer than the regulated time, on the basis of that the sheet conveyance speed becomes lower due to the decrease in the conveyance force of the sheet feeding roller.

However, the movement speed of the sheet which is fed is higher than the movement speed really should be when the sheet is fed by double feeding, that is, two or more sheets are nipped by the sheet feeding roller and the separating roller. Thus, it is not possible to correctly determine that the sheet feeding roller has come to the end of its life. In detail, when two or more sheets are nipped while the separating roller is rotating in the direction of applying a load to the sheet to be fed as described above, the sheet to be fed and the separating roller do not contact each other and the load is not applied to the sheet, resulting in the higher movement speed of the sheet. Since the double feeding occurs more easily as the conveyance force of the sheet feeding roller is lowered, the life determination is further delayed.

SUMMARY

The present invention has been made in consideration of the above problems, and an object of the present invention is to provide an image forming apparatus, a storage medium, and a life determination method which can eliminate the influence of the change in the movement speed caused by the double feeding, and determine the life of the sheet feeder at an appropriate timing.

To achieve at least one of the abovementioned objects, according to an aspect of the present invention, an image forming apparatus reflecting one aspect of the present invention includes: a sheet feeding roller which feeds a sheet accumulated on a tray; and a hardware processor which: detects a movement speed of the sheet that is currently fed by the sheet feeding roller; and calculates a difference amount between the movement speed and a first reference speed, and determines a life of the sheet feeding roller based on the difference amount, wherein the hardware processor determines whether or not to use the movement speed of a first sheet for life determination based on a relationship between the movement speed of the first sheet and the movement speed of a sheet which is fed before the first sheet, and if the hardware processor determines not to use the movement speed of the first sheet for the life determination, the hardware processor calculates the difference amount by excluding the movement speed of the first sheet.

According to a second aspect of the present invention, a storage medium reflecting one aspect of the present invention is a non-transitory computer readable storage medium storing a program causing a computer of an image forming apparatus, which includes a sheet feeding roller that feeds a sheet accumulated on a tray, to perform:

detecting a movement speed of the sheet that is currently fed by the sheet feeding roller; calculating a difference amount between the movement speed and a first reference speed, and determining a life of the sheet feeding roller based on the difference amount; and determining whether or not to use the movement speed of a first sheet for life determination based on a relationship between the movement speed of the first sheet and the movement speed of a sheet which is fed before the first sheet, and calculating the difference amount by excluding the movement speed of the first sheet if the movement speed of the first sheet is determined not to be used for the life determination.

According to a third aspect of the present invention, a life determination method reflecting one aspect of the present invention is a life determination method for determining a life of a sheet feeding roller which feeds a sheet accumulated on a tray, the method including: speed detecting of detecting a movement speed of the sheet that is currently fed by the sheet feeding roller; and life determining of calculating a difference amount between the movement speed and a first reference speed, and determining a life of the sheet feeding roller based on the difference amount, wherein in the life determining, whether or not to use the movement speed of a first sheet for life determination is determined based on a relationship between the movement speed of the first sheet and the movement speed of a sheet which is fed before the first sheet, and if the movement speed of the first sheet is determined not to be used for the life determination, the difference amount is calculated by excluding the movement speed of the first sheet.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF THE EMBODIMENTS

First Embodiment

Hereinafter, one or more embodiments of the present invention will be described with reference to the drawings. However, the scope of the invention is not limited to the disclosed embodiments.

[Outline of Image Forming Apparatus]

Figure 1:
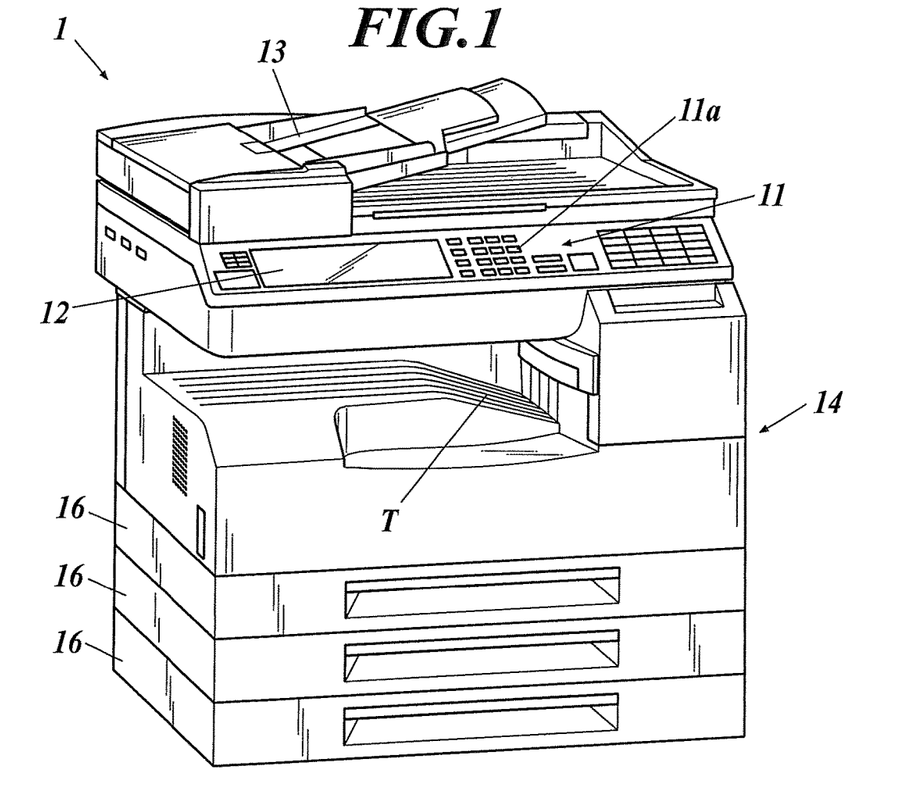
FIG. 1 is an external view of an image forming apparatus according to the present invention.
Figure 2:
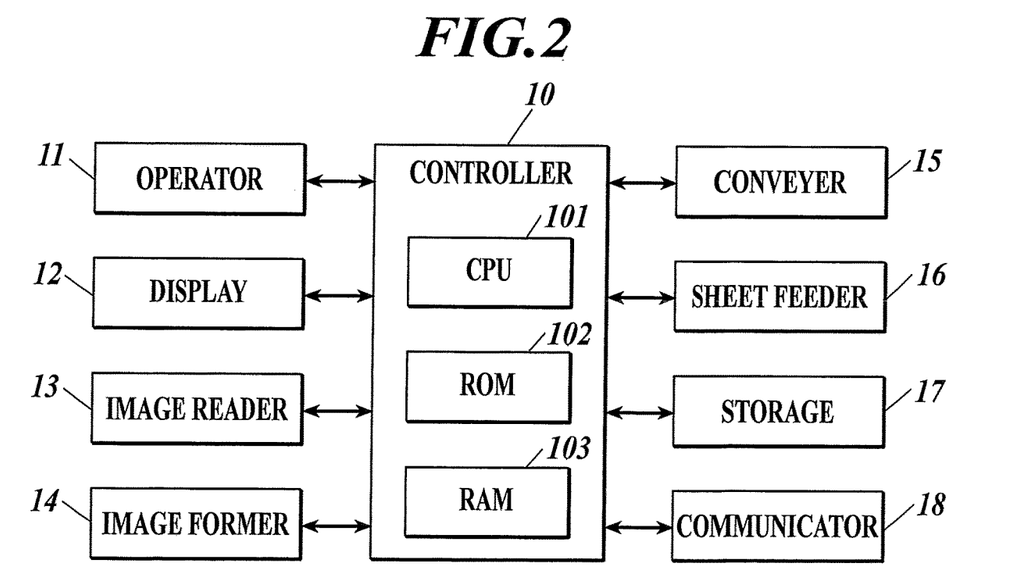
FIG. 2 is a block diagram showing a functional configuration of the image forming apparatus according to the present invention.

FIG. 1 is an external view of an image forming apparatus 1, and FIG. 2 is a block diagram showing the functional configuration of the image forming apparatus 1. The image forming apparatus 1 is a complex machine which has functions such as copy, scanner, printer and facsimile, and can perform data reception/transmission with external devices such as a personal computer via a network.

As shown in FIGS. 1 and 2, the image forming apparatus 1 is configured by including a controller 10, an operator 11, a display 12, an image reader 13, an image former 14, a conveyer 15, a sheet feeder 16, a storage 17, a communicator 18 and the like.

As shown in FIG. 1, the operator 11 and the display 12 are a user interface which is provided on the upper section of the image forming apparatus 1.

The operator 11 is a keypad including a plurality of keys 11a. The operator 11 generates an operation signal corresponding to user's operation, and outputs the operation signal to the controller 10. As the operator 11, a touch panel which is integrally formed with the display 12 or the like can be used as well as the key pad.

The display 12 displays an operation screen or the like in accordance with the instruction of the controller 10. As the display 12, an LCD (Liquid Crystal Display), an OELD (Organic Electro Luminescence Display) and the like can be used.

Figure 3:
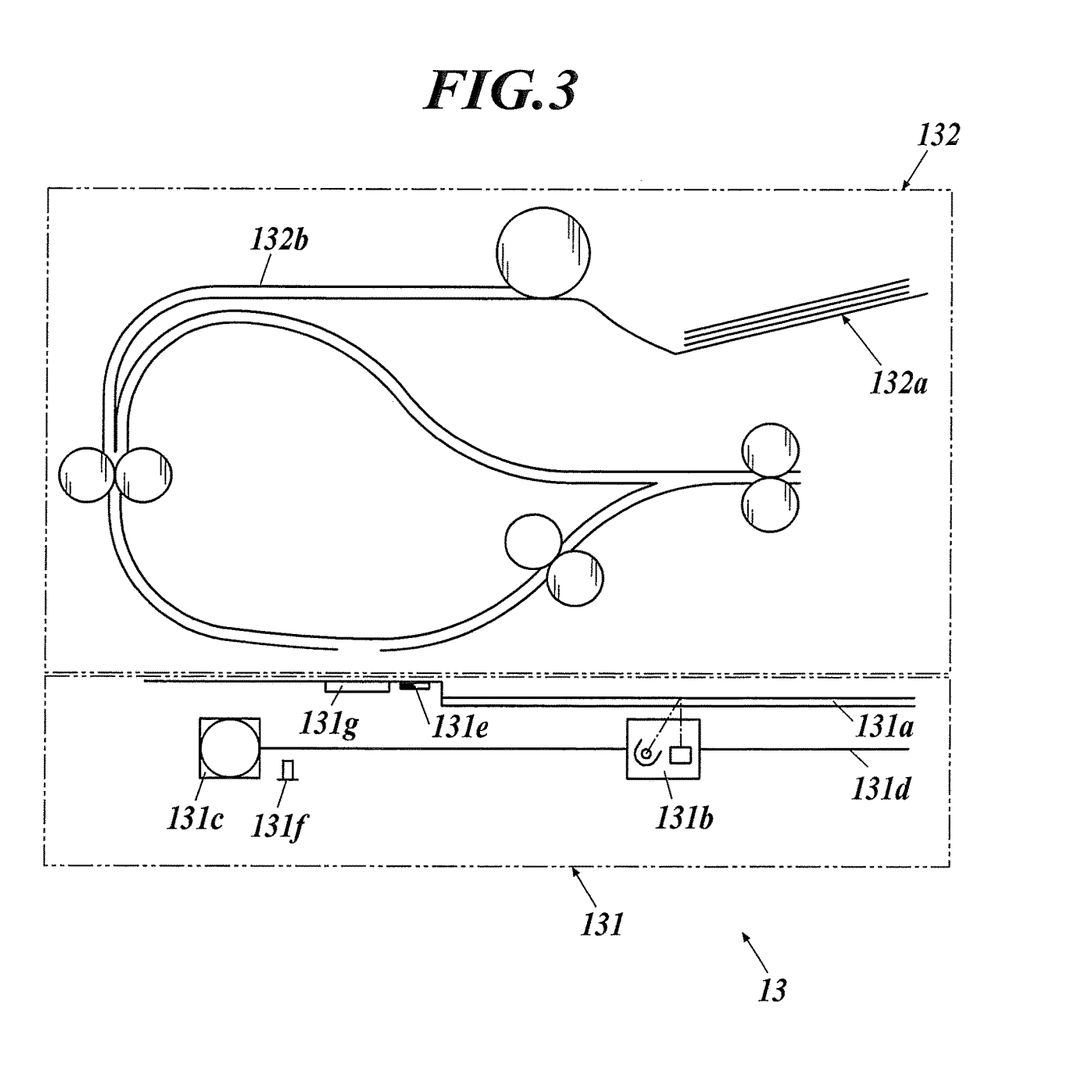
FIG. 3 is a view showing a schematic configuration of an image reader.

FIG. 3 is a view showing a specific configuration of the image reader 13. The image reader 13 is configured by including an IR section 131 and an ADF section 132.

The IR section 131 is configured by including: a document surface glass 131a; an IR module 131b which obtains image information of the document; an IR motor 131c which scans the document; a drive transmitter 131d such as a belt and a wire; a shading plate 131e for obtaining reference white output; a home position sensor 131f as a reference position for positioning, and the like.

The ADF section 132 includes a conveyance path 132b which includes rollers that convey the document placed on a document tray 132a, and sends the document to the IR section 131 automatically.

Figure 4:
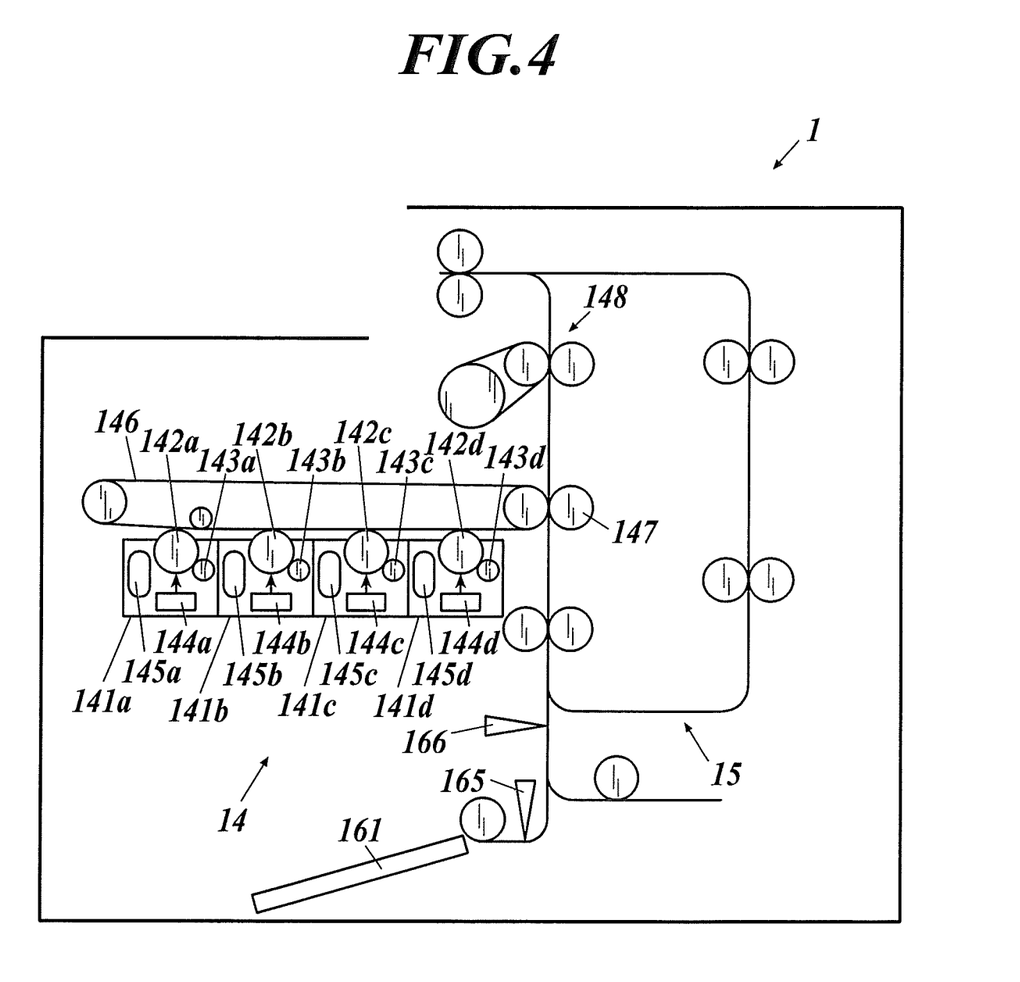
FIG. 4 is a view showing a schematic configuration of an image former.

The image former 14 prints an image on a recording sheet on the basis of image data which was obtained by the image reader 13, image data which was received from the external device by the communicator 18, or image data stored in the storage 17.

FIG. 4 is a view showing a schematic configuration of the image former 14.

The cartridges 141a, 141b, 141c and 141d respectively have chargers 143a, 143b, 143c and 143d that charge the photoreceptors 142a, 142b, 142c and 142d, exposures 144a, 144b, 144c and 144d that expose the image pattern, and developers 145a, 145b, 145c and 145d that develop toners, which are built in the cartridges 141a, 141b, 141c and 141d. The image former 14 is configured by including an intermediate transfer belt 146 which performs image formation by superposing the toner images of four colors formed on the photoreceptors 142a, 142b, 142c and 142d, a secondary transfer roller 147 which transfers the toner image formed on the intermediate transfer belt 146 onto the sheet, a fixer 148 which heats and fixes the toner images formed on the sheet, and the like.

The conveyer 15 includes a conveyance path which has a plurality of conveyance roller pairs. The conveyer 15 conveys the sheet fed from the sheet feeder 16 to the image former 14, and ejects the sheet on which the image was formed by the image former 14 to the sheet feeding tray T.

Each of the sheet feeders 16 is provided in the lower section of the main body of the image forming apparatus 1, and supplies the sheet to the image former 14. The specific configuration of the sheet feeder 16 will be described later.

As shown in FIG. 2, the controller 10 is configured by including a CPU (Central Processing Unit) 101, a ROM (Read Only Memory) 102, a RAM (Random Access Memory) 103, and the like. The CPU 101 reads out a program corresponding to the processing contents from the ROM 102, loads the program onto the RAM 103, and integrally controls the operations of the components of the image forming apparatus 100 in cooperation with the loaded program. At this time, various types of data stored in the storage 17 are referred to.

The storage 17 is configured by including a nonvolatile semiconductor memory (what is called a flash memory) and a hard disk drive, for example.

The communicator 18 is formed of a communication control card such as a LAN card, and can perform transmission/reception of various types of data with the external device (for example, a personal computer) which is connected to a communication network such as a LAN (Local Area Network) and a WAN (Wide Area Network).

[Specific Configuration of Sheet Feeder]

Figure 5:
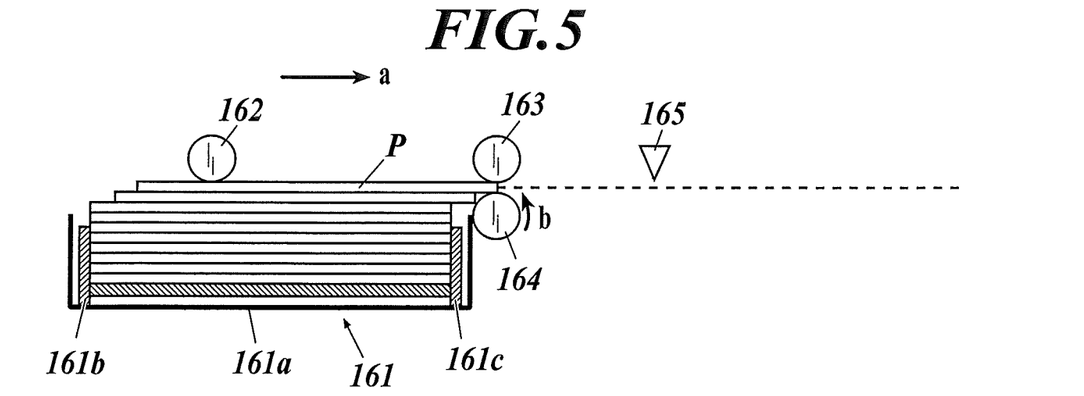
FIG. 5 is a view showing a normal sheet feeding state in a sheet feeder.

Next, the specific configuration of the sheet feeder 16 will be described.

FIG. 5 is a view showing the specific configuration of the sheet feeder 16. The sheet feeder 16 is configured by including a tray 161, a pickup roller 162, a sheet feeding roller 163, a separating roller 164, a first sensor 165, and the like.

The tray 161 includes a sheet accumulation table 161a which has a placement surface to place a plurality of sheets P in an accumulated state, a rear end regulating member 161b which is provided on the upstream side in the sheet feeding direction a of the sheet placed inside the tray 161, and a front end regulating member 161c which is provided on the downstream side in the sheet feeding direction a of the sheet placed inside the tray 161.

In the following description of the sheet feeder 16, the direction which is a horizontal direction orthogonal to the sheet feeding direction a and a left hand direction in a state of facing the sheet feeding direction a is referred to as "left" (background direction in FIG. 5), and the direction which is a horizontal direction orthogonal to the sheet feeding direction a and a right hand direction in a state of facing the sheet feeding direction a is referred to as "right" (foreground direction in FIG. 5).

The sheet accumulation table 161a is supported to be movable up and down in the sheet feeder 16, and the rear end regulating member 161b and the front end regulating member 161c are mounted to be movable in the sheet conveyance direction (both of upstream side and downstream side) according to the length of the conveyance direction of the sheet placed in the sheet feeder 16.

An actuator not shown in the drawings applies the upward or downward movement to the sheet accumulation table 161a, and the actuator is controlled by the controller 10 so that the uppermost sheet of the sheets P accumulated on the sheet accumulation table 161a remains at a position slightly higher than the upper end of the front end regulating member 161c. It is possible to lower the sheet accumulation table 161a when the sheet feeding is not performed, such as at the time of supplement of the sheet P or the like.

The sheet feeder 16 is provided so as to be openable and closable toward the left direction or the right direction of the tray 161 by the user.

As shown in FIG. 5, the pickup roller 162, the sheet feeding roller 163 and the separating roller 164 are provided above the sheet accumulation table 161a.

The pickup roller 162 is provided to be able to contact the sheet P and rotate near the end portion in the upstream side of the sheet P with respect to the sheet feeding direction a of the sheet P. The pickup roller 162 is provided to be able to press the sheet P and separate from the sheet P by being moved up and down by a solenoid not shown in the drawings.

The sheet feeding roller 163 and the separating roller 164 are provided to form a pair on the downstream side of the accumulated sheet P in the sheet feeding direction a.

The sheet feeding roller 163 is provided such that the surface of the sheet feeding roller 163 rotates in the same direction as the sheet feeding direction a at the nip section with the separating roller 164, by a motor not shown in the drawings. Thus, the sheet feeding roller 163 contacts the sheet P which was pushed out to the downstream side by the pickup roller 162, and rotates to convey the sheet P toward the downstream conveyance path.

The separating roller 164 is provided such that the surface of the separating roller 164 rotates (rotates in the direction shown by the arrow b in the drawing) in the opposite direction to the sheet feeding direction a at the nip section with the sheet feeding roller 163, by a motor not shown in the drawings. Thus, the separating roller 164 separates the uppermost sheet P from the sheet(s) accumulated under the uppermost sheet P, and prevents a sheet(s) other than the uppermost sheet P from being conveyed on the conveyance path. Alternatively, the same effect can be obtained also by configuring the separating roller 164 with a member which does not rotate.

As shown in FIG. 5, a first sensor 165 which detects the sheet feeding of the sheet P is mounted on the downstream side in the sheet feeding direction a of the tray 161.

The first sensor 165 is an optical or touch sensor which detects passage of the front end of the sheet fed from the tray 161. When the first sensor 165 detects the passage of the front end of the sheet, the first sensor 165 outputs the detection signal to the CPU 101 of the controller 10 as necessary.

[Life Determination Method]

Next, the life determination method of the sheet feeding roller 163 according to the embodiment will be described with reference to the drawings.

The surface of the sheet feeding roller 163 is abraded by the friction with the sheet at each sheet feeding. When the surface is abraded, the conveyance force of the sheet feeding roller 163 is lowered, and the movement speed of the sheet becomes lower. Accordingly, when the movement speed of the sheet is lowered by a predetermined amount, it is detected that the sheet feeding roller 163 has come to the end of its life by the abrasion of the surface of the sheet feeding roller 163, and the sheet feeding roller 163 is determined to get to the replacement time.

In detail, first, the movement speed of the sheet from the start of sheet feeding to the arrival at the first sensor 165 is referred to as a first movement speed V1. The first movement speed V1 is calculated on the basis of the time from the time of sheet feeding start (time when the signal instructing the start of sheet feeding reached the pickup roller 162 from the CPU 101) to the time when the front end of the sheet reaches the first sensor 165 (time when the first sensor 165 transmitted the detection signal of the sheet front end to the CPU 101), and the distance between the sheet feeding roller 163 and the first sensor 165.

The first movement speed V1 may be measured with a measuring device such as a laser Doppler and an encoder, and not limited to the abovementioned calculated method.

Next, the average value of the first movement speeds V1 of a predetermined number of sheets (for example, ten sheets), which were fed before the sheet P0, is calculated, and the average value is referred to as an average movement speed Va. The movement speed when the sheet feeding roller 163 has not come to the end of its life is referred to as a first reference speed V0a. When the difference amount between the values of the first reference speed V0a and the average movement speed Va is a predetermined value or more (for example, the values of the first reference speed V0a and the average movement speed Va are different from each other by 40% or more), it is determined that the sheet feeding roller 163 has come to the end of its life and the sheet feeding roller 163 needs to be replaced.

The first reference speed V0a is a design value of the movement speed which was set in advance. In the embodiment, the first reference speed V0a is calculated from the time that is from the time of sheet feeding start to the time when the front end of the sheet reaches the first sensor 165 in the endurance initial state, and the distance between the sheet feeding roller 163 and the first sensor 165.

The first reference speed V0a may be variable according to the sheet type or the like. The above mentioned predetermined number of sheets and the predetermined rate are examples, and may be variable on the basis of the sheet feeding state, sheet type, user's request and the like.

[Determination Method of Whether to Use Movement Speed for Life Determination]

Whether or not to use the movement speed of the sheet for the above mentioned life determination is determined by the following method.

When a sheet is fed with double feeding by the sheet feeding roller 163, the first movement speed V1 of the sheet is not used for the life determination since the first movement speed V1 changes.

Figure 6:
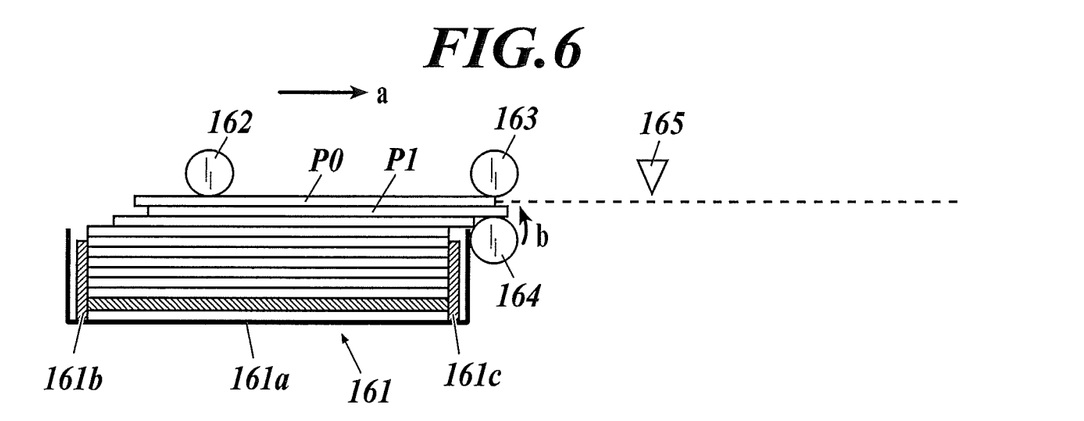
FIG. 6 is a view showing a sheet feeding state of double feeding in the sheet feeder.

FIGS. 5 and 6 are views showing the schematic configuration of the sheet feeder 16. FIG. 5 shows the normal sheet feeding state, and FIG. 6 shows the state in which the sheet P1 accumulated under the sheet P0 to be fed is fed by double feeding.

As shown in FIG. 5, at the normal sheet feeding, only the uppermost sheet P to be fed is nipped by the nip section of the sheet feeding roller 163 and the separating roller 164. Since the separating roller 164 is rotating in the b direction in the drawing as mentioned above, a load in an opposite direction to the sheet feeding direction a is applied to the sheet P to be fed.

On the other hand, at the double feeding as shown in FIG. 6, the sheet P0 to be fed and the sheet P1 under the sheet P0 are nipped by the nip section of the sheet feeding roller 163 and the separating roller 164. Accordingly, the load by the rotation of the separating roller 164 is applied to the sheet P1, and not applied to the sheet P0 to be fed.

That is, at the double feeding as in FIG. 6, the first movement speed V1 by the sheet feeding roller 163 becomes higher compared to the first movement speed V1 at the normal sheet feeding as in FIG. 5.

Accordingly, it is desirable to determine whether or not to use the first movement speed V1 of the sheet P0 for the life determination on the basis of the relationship between the first movement speed V1 of the sheet P0 and the movement speed of the sheet which was fed before the sheet P0.

In detail, the average value of the movement speeds of a predetermined number of sheets (for example, ten sheets) which were fed before the sheet P0 is calculated, and the average value is referred to as the second reference speed V1a. When the speed difference between the first movement speed V1 of the sheet P0 and the second reference speed V1a is a predetermined speed difference or more (for example, the first movement speed V1 of the sheet P0 is higher than the second reference speed V1a by 5% or more), the first movement speed V1 of the sheet P0 is determined not to be used for the life determination of the sheet feeding roller 163.

The above mentioned predetermined speed difference between the first movement speed V1 and the second reference speed V1a is an example, and may be variable on the basis of the sheet feeding state, the type of the sheet P, and the like.

Figure 7:
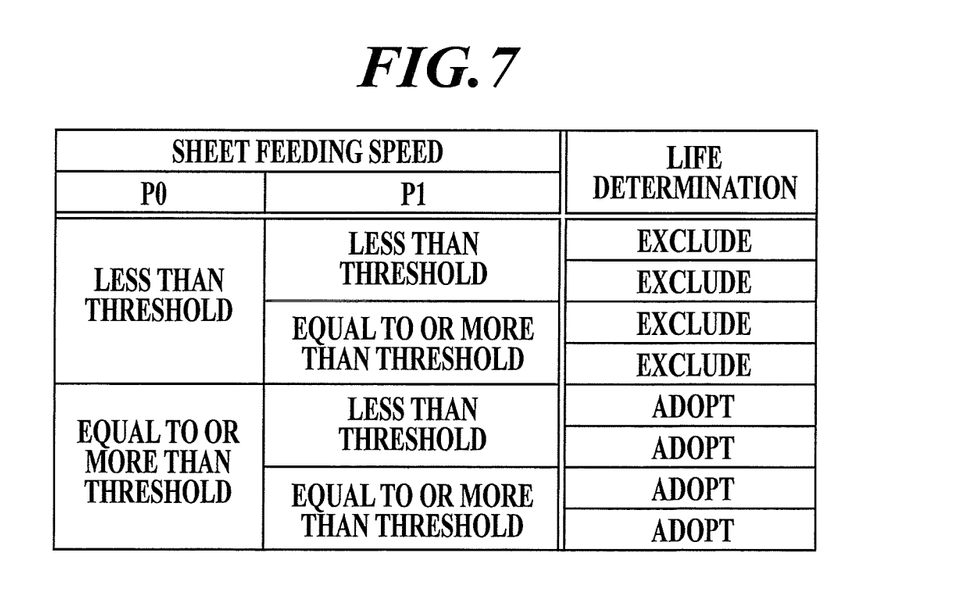
FIG. 7 is an example of a matrix view which is used for the life determination in a first embodiment.

FIG. 7 shows a matrix which is used for determining whether or not to adopt the first movement speed V1 for the life determination. Here, the sheet to be fed is referred to as P1 (hereinafter, described as the present sheet P1), and the sheet which was fed immediately before the present sheet P1 is referred to as P0 (hereinafter, described as the previous sheet P0), and FIG. 7 shows whether or not to adopt the previous sheet P0 for the life determination.

As shown in FIG. 7, in the embodiment, when the first movement speed V1 of the previous sheet P0 is determined to be higher by a predetermine speed difference or more (less than a threshold) than the second reference speed V1a of the predetermined number of sheets which were fed immediately before the previous sheet P0, there is a possibility that the previous sheet P0 does not receive the load of the separating roller 164 due to the double feeding of the previous sheet P0. Thus, the first movement speed V1 of the previous sheet P0 is not used for the life determination.

Figure 8:
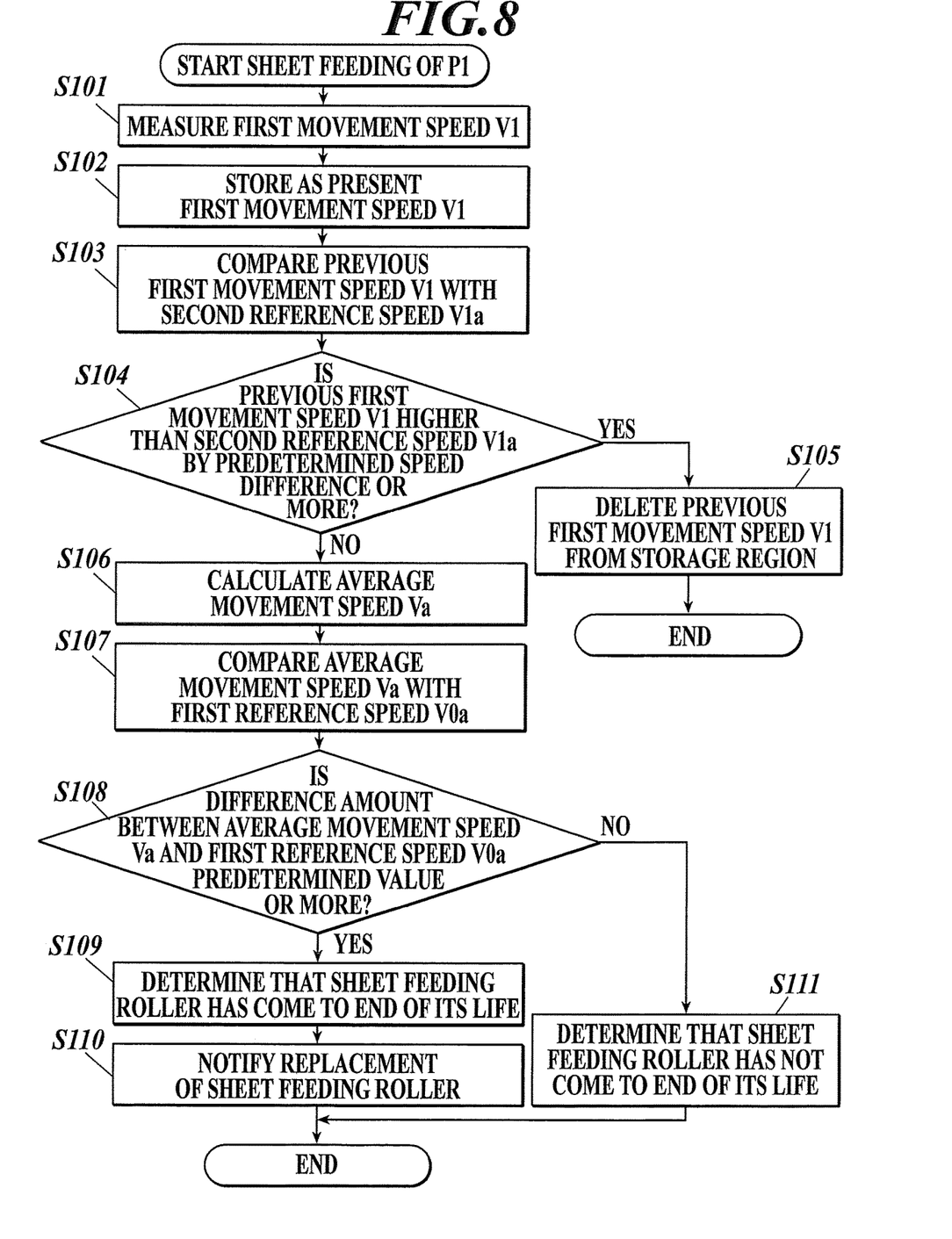
FIG. 8 is a flowchart showing the operation of the image forming apparatus in the first embodiment.

FIG. 8 is a flowchart showing the operation of the image forming apparatus 1 in the embodiment. The processing shown in FIG. 8 is achieved by a cooperation between the controller 10 and the program stored in the storage 17.

When the sheet feeding of the present sheet P1 is started, the controller 10 measures the first movement speed V1 from the time of sheet feeding start to the detection of the front end of the present sheet P1 by the first sensor 165 (step S101). In detail, the first movement speed V1 is calculated on the basis of the time after the sheet feeding start signal was transmitted from the CPU 101 to the pickup roller 162 until the front end of the sheet was detected by the first sensor 165, and the distance between the sheet feeding roller 163 and the first sensor 165.

The controller 10 then stores the first movement speed V1 of the present sheet P1 (hereinafter, referred to as the present first movement speed V1) which was measured in step S101 in a temporary storage region (RAM 103 or the like) which is managed by the controller 10 (step S102).

Next, the controller 10 compares the first movement speed V1 (hereinafter, described as the previous first movement speed V1) of the previous sheet P0 with the second reference speed V1a (step S103).

The controller 10 determines whether or not the previous first movement speed V1 is higher than the second reference speed V1a by the predetermined speed difference or more as the result of the comparison (step S104). If the controller 10 determines that the previous first movement speed V1 is higher than the second reference speed V1a by the predetermined speed difference or more (step S104; YES), the controller 10 proceeds to step S105. If the controller 10 determines that the previous first movement speed V1 is not higher than the second reference speed V1a by the predetermined speed difference or more (step S104; NO), the controller 10 proceeds to step S106.

In step S105, the controller 10 deletes the previous first movement speed V1 from the storage region. That is, the controller 10 determines not to adopt the previous first movement speed V1 for the life determination, and ends the control.

On the other hand, in step S106, the controller 10 calculates the average movement speed Va. That is, the controller 10 calculates the average value of the first movement speeds V1 of the predetermined number of sheets including the previous first movement speed V1. The calculated average value is referred to as the average movement speed Va.

The controller 10 compares the average movement speed Va with the first reference speed V0a (step S107).

Next, the controller 10 determines whether or not the difference amount between the average movement speed Va and the first reference speed V0a is the predetermined value or more as the result of comparison (step S108). That is, in step S108, the controller 10 compares the average value of the first movement speeds V1 of the predetermined number of sheets including the previous sheet P0 with the movement speed which is assumed when the sheet feeding roller 163 has not come to the end of its life.

If the controller 10 determines that the difference amount is the predetermined value or more (step S108; YES), the controller 10 proceeds to step S109. If the controller 10 determines that the difference amount is not the predetermined value or more (step S108; NO), the controller 10 proceeds to step S111.

In step S109, the controller 10 determines that the sheet feeding roller 163 has come to the end of its life, notifies the user that the replacement time of the sheet feeding roller 163 has come (step S110), and ends the control.

In step S111, the controller 10 determines that the sheet feeding roller 163 has not come to the end of its life, and ends the control.

As described above, the image forming apparatus 1 in the embodiment calculates the difference amount between the movement speed and the first reference speed, and determines the life of the sheet feeding roller 163 on the basis of the difference amount. The image forming apparatus 1 determines whether or not to use the movement speed of the first sheet for the life determination on the basis of the relationship between the movement speed of the first sheet (in the embodiment, the previous sheet P0) and the movement speeds of the sheets which were fed before the first sheet. Furthermore, the image forming apparatus 1 determines the life of the sheet feeding roller 163 at the time when the second sheet (in the embodiment, the present sheet P1), which is fed by the sheet feeding roller 163 immediately after the first sheet, reaches the first sensor 165.

Accordingly, it is possible to determine the life of the sheet feeding roller 163 accurately by excluding the movement speed of the sheet from the target of the life determination in a case where the accurate movement speed cannot be detected due to the double feeding of the sheet.

In the embodiment, the life is determined on the basis of the difference amount between the first reference speed and the average value of the movement speeds of the predetermined number of sheets. Thereby, reliability of detection of the decrease in the conveyance force related to the endurance of the sheet feeding roller 163 is improved.

In the embodiment, the movement speed from the start of sheet feeding to the detection of the front end of the sheet by the first sensor 165 is detected as the first movement speed. If the first movement speed of the first sheet is higher than the second reference speed by the predetermined speed difference or more, it is determined not to use the first movement speed of the first sheet for the life determination. Accordingly, the reliability of the life determination is improved by detecting the increase in the speed due to the double feeding of the first sheet and excluding the speed from the target of the life determination.

In the embodiment, the second reference speed is the average value of the movement speeds of a predetermined number of sheets. Accordingly, when the movement speed of the first sheet is remarkably high on the basis of the relationship with the movement speeds of the plurality of sheets which were conveyed before the first sheet, this can be surely detected.

In the embodiment, the first reference speed is a value which was set in advance. Accordingly, since the data with a high reliability can be set as a reference in advance, the reliability of the life determination is improved.

Modification Example 1

Hereinafter, the modification example 1 in the first embodiment will be described with reference to the drawings. Though various technically preferable limitations are provided to perform the present invention in the following embodiment, the scope of the present invention is not limited to the following embodiment and the illustrated examples.

Figure 9:
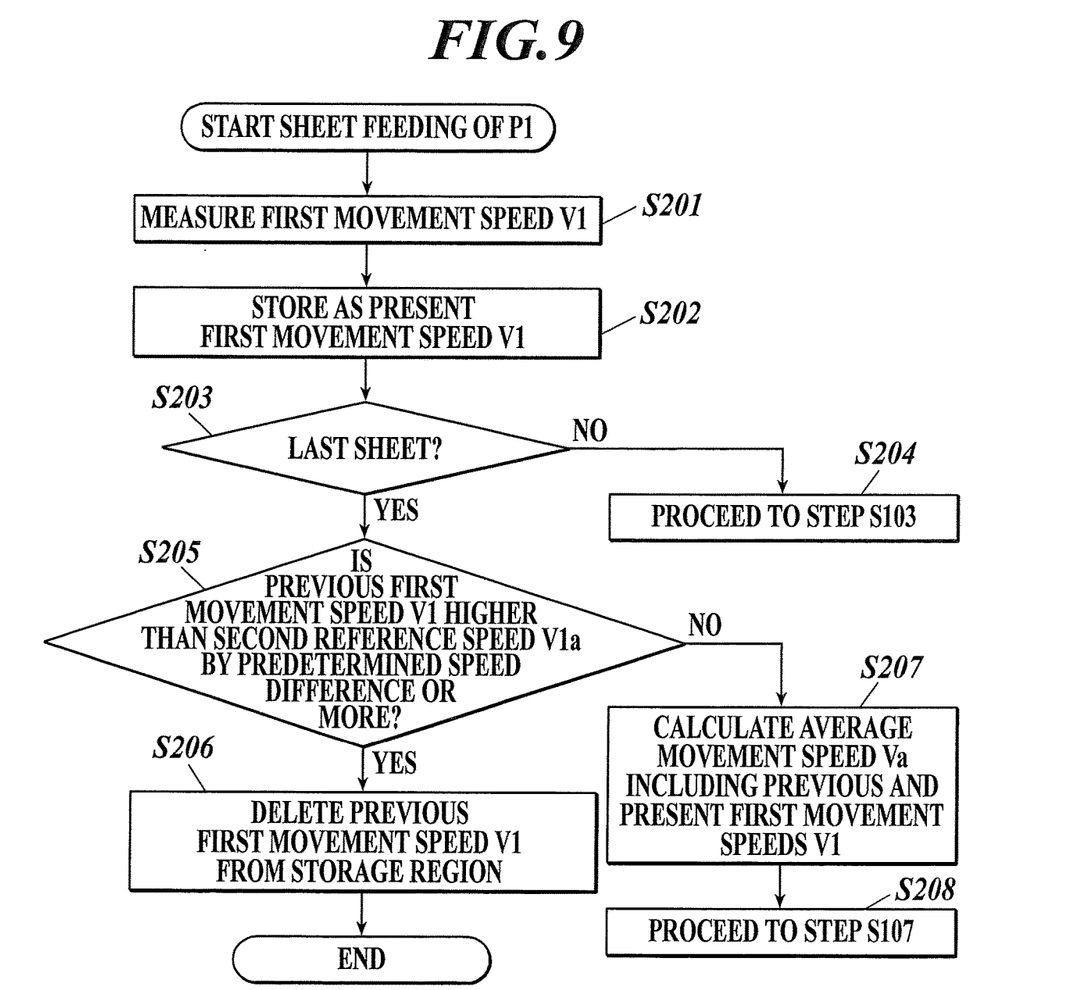
FIG. 9 is a flowchart showing the operation of an image forming apparatus in a modification example 1.

In the modification example 1, when the sheet to be fed is the last sheet of the sheets stored in the sheet feeder 16, the sheet is not excluded from the target of the life determination. The first movement speed V1 of the sheet is always used for the life determination.

In the first embodiment, whether or not to use the first movement speed V1 of the previous sheet P0 was determined after the first movement speed V1 of the present sheet P1 was detected. However, in a case where the sheet is the last sheet, since there is no sheet to be conveyed next, the life determination is performed at the time when the first movement speed V1 of the last sheet was detected.

Accordingly, the first movement speed V1 of the last sheet is not excluded from the target of the life determination, but is always included in the calculation of the average movement speed Va. Then, the life determination is executed on the basis of the difference amount between this average movement speed Va and the first reference speed V0$a$. This is because the last sheet is always nipped by the sheet feeding roller 163 and the separating roller 164, and receives the load from the separating roller 164.

FIG. 9 is a flowchart showing the operation of the image forming apparatus 1 in the embodiment.

The processing in FIG. 9 is achieved by a cooperation between the controller 10 and the program stored in the storage 17.

When the sheet feeding of the present sheet P1 is started, the controller 10 measures the movement speed from the time of sheet feeding start to the detection of the front end of the present sheet P1 by the first sensor 165 (step S201).

The controller 10 then stores the present first movement speed V1 which was measured in step S201 in the temporary storage region (RAM 103 or the like) which is managed by the controller 10 (step S202).

The controller 10 determines whether or not the present sheet P1 is the last sheet (step S203). If the controller 10 determines that the sheet is not the last sheet (step S203; NO), the controller 10 proceeds to step S103 in FIG. 8 (step S204).

On the other hand, if the controller 10 determines that the sheet is the last sheet (step S203; YES), the controller 10 determines whether or not the previous first movement speed V1 is higher than the second reference speed V1$a$ by the predetermined speed difference or more (step S205). If the controller 10 determines that the previous first movement speed V1 is higher than the second reference speed V1$a$ by the predetermined speed difference or more (step S205; YES), the controller 10 deletes the previous first movement speed V1 from the storage region and ends the control (step S206).

If the controller 10 determines that the previous first movement speed V1 is not higher than the second reference speed V1$a$ by the predetermined speed difference or more, the controller 10 calculates the average movement speed Va including the previous first movement speed V1 and the present first movement speed V1 (step S207). That is, since the previous sheet P0 is considered to have been normally conveyed, the controller 10 adopts the first movement speed V1 of the previous sheet P0 for the life determination, and also uses the first movement speed V1 of the present sheet P1 for the life determination.

The controller 10 then proceeds to step S107 in FIG. 8, and the subsequent processing is executed in accordance with the flowchart in FIG. 8.

As described above, in the image forming apparatus 1 according to the modification example 1, in a case where the first sheet is the last sheet among the sheets which are accumulated on the tray, the life of the sheet feeding roller 163 is determined at the time when the first sheet reaches the first sensor 165. Accordingly, the reliability can be improved by adopting the last sheet as the target of the life determination in consideration that the last sheet always receives the load from the separating roller 164.

Modification Example 2

Hereinafter, the modification example 2 in the first embodiment will be described with reference to the drawings. Though various technically preferable limitations are provided to perform the present invention in the following embodiment, the scope of the present invention is not limited to the following embodiment and the illustrated examples.

Figure 10:
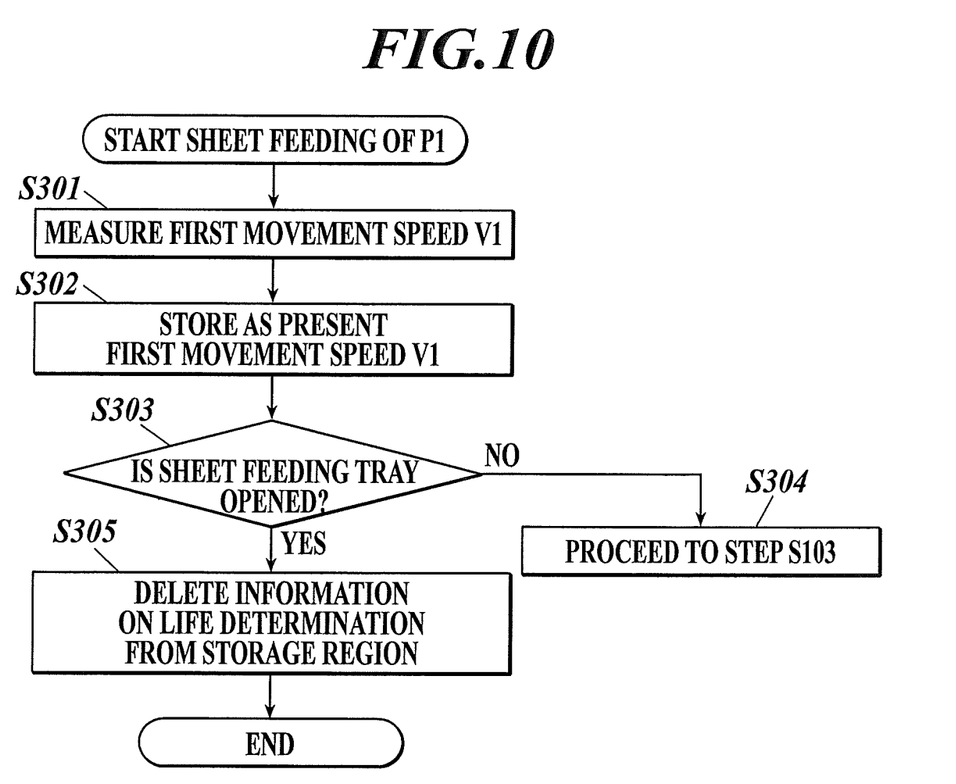
FIG. 10 is a flowchart showing the operation of an image forming apparatus in a modification example 2.

In the modification example 2, in a case where the sheet feeder 16 is opened by the user while the sheet is being fed by the sheet feeding roller 163, the sheet which is being fed is not adopted for the life determination. When the sheet feeder 16 is opened during the sheet feeding, the state of sheet bundle including the sheet which is to be fed next changes from the state when the tray was closed. In detail, as described above, the sheet accumulation table 161a is supported so as to be movable up and down in the sheet feeder 16, and control is made such that the uppermost section of the accumulated sheets P maintains a position which is slightly higher than the upper end of the front end regulating member 161c. However, when the sheet feeder 16 is opened, the sheet accumulation table 161a is lowered, and the sheet bundle is lowered by its own weight. As a result, since the influence by the sheet bundle on the sheet which is being fed is not fixed, it is appropriate not to use the first movement speed V1 of the present sheet for the life determination.

In this case, the information which is stored in the storage 17 to be used for the life determination (first movement speed V1 and first reference speed V0a) is deleted. This is because the type of sheet is possibly changed when the tray 161 is opened. Since the sheet feeder 16 conveys the sheet such that the movement speed is according to the type of the sheet, it is desirable to change the first reference speed V0a which is used for the life determination.

FIG. 10 is a flowchart showing the operation of the image forming apparatus 1 in the embodiment.

The processing in FIG. 10 is achieved by a cooperation between the controller 10 and the program stored in the storage 17.

When the sheet feeding of the present sheet P1 is started, the controller 10 measures the movement speed from the time of sheet feeding start to the detection of the front end of the present sheet P1 by the first sensor 165 (step S301).

The controller 10 then stores the present first movement speed V1 which was measured in step S301 in the temporary storage region (RAM 103 or the like) which is managed by the controller 10 (step S302).

The controller 10 determines whether or not the sheet feeder 16 was opened (step S303). If the controller 10 determines that the sheet feeder 16 is not opened (step S303; NO), the controller 10 proceeds to step S103 in FIG. 8 (step S304), and performs the life determination in accordance with the flowchart in FIG. 8 by using the measured first movement speed V1. However, if the controller 10 determines that the sheet feeder 16 is opened (step S303; YES), the controller 10 proceeds to step S305.

In step S305, the controller 10 deletes the information which is necessary for the life determination from the storage region, and ends the control.

As described above, in the image forming apparatus 1 in the modification example 2, when it is detected that the tray 161 was opened during the sheet feeding of the second sheet to be fed immediately after the first sheet, it is determined not to use the movement speed of the first sheet for the life determination, and deletes the data used for the life determination which was stored in the storage 17. Accordingly, it is possible to eliminate the influence on the sheet by the tray 161 being opened, and determine the life accurately.

It is also possible to perform the processing in the modification example 2 together with the above-mentioned processing in the modification example 1.

Second Embodiment

Hereinafter, the second embodiment of the present invention will be described with reference to the drawings. Though various technically preferable limitations are provided to perform the present invention in the following embodiment, the scope of the present invention is not limited to the following embodiment and the illustrated examples.

Figure 11:
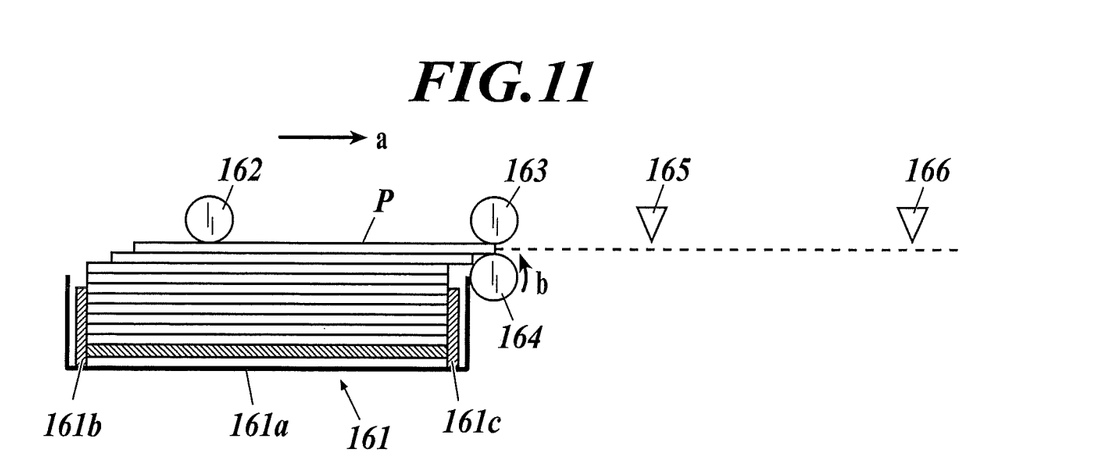
FIG. 11 is a view showing a normal sheet feeding state in a sheet feeder.

A feature of the image forming apparatus 1 in the second embodiment is including a second sensor 166 in addition to the first sensor 165.

FIG. 11 is a view showing the schematic configuration of the sheet feeder 16 of the image forming apparatus 1 in the second embodiment. As shown in FIG. 11, the second sensor 166 is provided on the downstream side in the sheet feeding direction a of the first sensor 165. The second sensor 166 is an optical or touch sensor which detects the passage of the front end of the sheet which was fed from the tray 161, similarly to the first sensor 165. When the second sensor 166 detects the passage of the front end of the sheet, the second sensor 166 outputs the detection result to the controller 10 as needed.

Since it is necessary to surely detect the change in the movement speed due to the abrasion of the sheet feeding roller 163, the distance between the first sensor 165 and the sheet feeding roller 163 is shorter than the length of the sheet in the conveyance direction.

[Life Determination Method]

In the embodiment, the movement speed from the time when the front end of the sheet reached the first sensor 165 to the time when the front end of the sheet reached the second sensor 166 (time when the second sensor 166 transmitted the detection signal of the front end of the sheet to the CPU 101) is measured as the second movement speed V2. The average value of the second movement speeds V2 of respective predetermined number of sheets (for example ten sheets) is calculated as the average movement speed Vb. If the difference amount between the average movement speed Vb and the first reference speed V0b is a predetermined value or more, it is determined that the sheet feeding roller 163 has come to the end of its life.

The first reference speed V0b is a design value of the movement speed which was set in advance. In the embodiment, the first reference speed V0b is the value which is calculated from the time until the front end of the sheet P reaches the second sensor 166 from the first sensor 165 in the endurance initial state, and the distance between the first sensor 165 and the second sensor 166.

The first reference speed V0b may be variable according to the type of the sheet or the like. The above described predetermined number of sheets and the predetermined rate are examples, and may be variable on the basis of the sheet feeding state, the type of the sheet, user's request, and the like.

Thus, in the embodiment, it is possible to determine that the sheet feeding roller 163 has come to the end of its life by using the average movement speed Vb which suppresses the influence by the change in the position of the front end of the sheet at the time of sheet feeding start.

In the first embodiment, the sheet feeding roller 163 is determined to have come to the end of its life on the basis of the first movement speed V1 from the time of sheet feeding start to the arrival at the first sensor 165. However, the first movement speed V1 is easily influenced by the change in the position of the front end of the sheet at the time of sheet feeding start (for example, the movement of the sheet P1, which was fed by double feeding with the sheet P0, toward the downstream side of the original front end position when the sheet feeding starts). On the other hand, since the second movement speed V2 represents the movement speed of the sheet between the first sensor 165 and the second sensor 166, it is possible to suppress the influence by the change in the front end position of the sheet at the time of sheet feeding start.

[Determination Method of Whether to Use Movement Speed for Life Determination]

In the embodiment, whether or not to use the previous second movement speed V2 for the life determination is determined on the basis of both of the difference between the previous first movement speed V1 and the second reference speed V1a and the difference between the present first movement speed V1 and the second reference speed V1a.

This will be described by using FIGS. 11 and 12. FIG. 11 shows a normal sheet feeding state, and FIG. 12 shows a state of double feeding of the sheet accumulated under the sheet P which is to be fed.

As described above, at the time of double feeding as in FIG. 12, the first movement speed V1 of the sheet P0 which is conveyed by the sheet feeding roller 163 becomes higher than the first movement speed V1 of the sheet which was conveyed normally.

Figure 12:
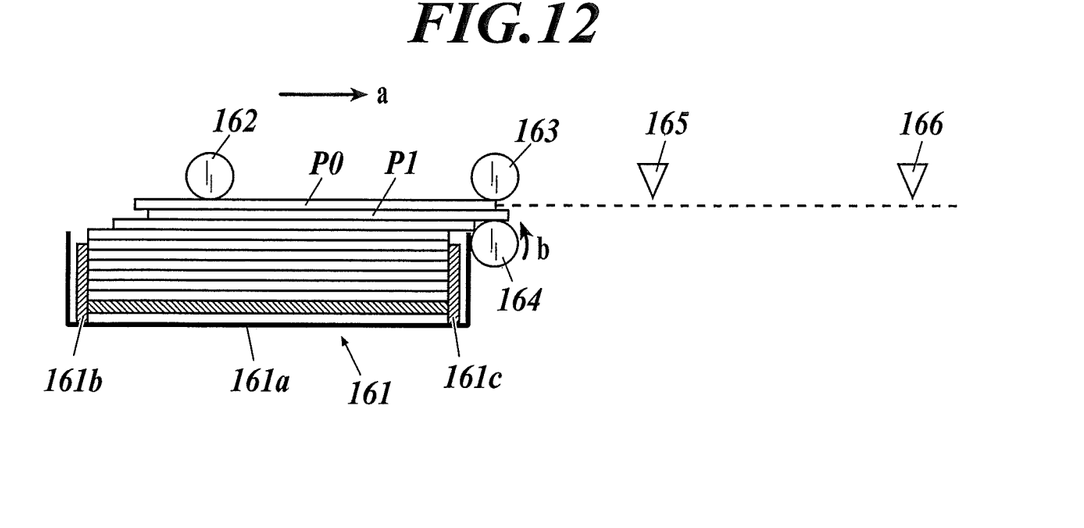
FIG. 12 is a view showing a normal sheet feeding state in a sheet feeder.

The sheet P1 accumulated under the sheet P0 is nipped by the nip section after the conveyance of the sheet P0 was completed in a case of normal conveyance as in FIG. 11, whereas the sheet P1 is already nipped by the nip section at the time when the sheet P0 is fed in a case of the double feeding as in FIG. 12. That is, since the time point of starting conveyance of the sheet P1 is moved forward, the time until the arrival of the front end at the first sensor 165 is shortened, and the first movement speed V1 which is measured for the sheet P1 becomes higher.

Accordingly, since it is possible to determine that the sheet P0 which was previously fed was fed with double feeding if both of the previous first movement speed V1 and the present first movement speed V1 are higher than the second reference speed V1a by the predetermined speed difference or more, the previous second movement speed V2 is not adopted for the life determination.

Figure 13:
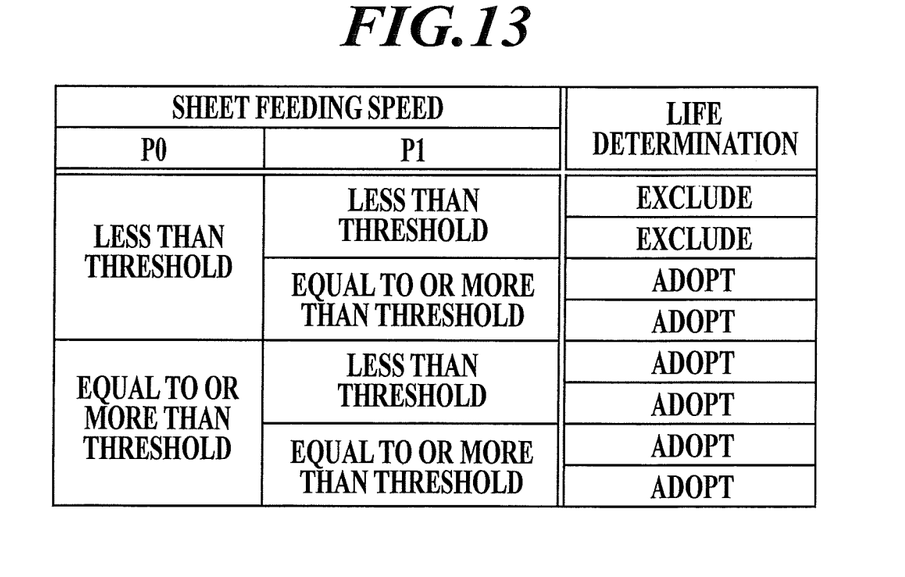
FIG. 13 is an example of a matrix view which is used for the life determination in a second embodiment.

FIG. 13 shows a matrix which is used for determining whether or not to adopt the previous second movement speed V2 for the life determination.

As shown in FIG. 13, in the embodiment, when the previous first movement speed V1 is higher than the second reference speed V1a by the predetermined speed difference or more (less than the threshold), and the present first movement speed V1 is higher than the second reference speed V1a by the predetermined speed difference or more (less than the threshold), it is considered that the previous sheet P0 does not receive the load of the separating roller 164 as a result of double feeding of the previous sheet P0 and the present sheet P1. Thus, the previous second movement speed V2 is not used for the life determination.

On the other hand, when it is determined that the previous first movement speed V1 is less than the threshold and the present first movement speed V1 is the threshold or more, the previous second movement speed V2 is used for the life determination.

Though the first movement speed V1 of the previous sheet P0 becomes higher due to the double feeding with the sheet which was fed immediately before the previous sheet P0, the double feeding of the previous sheet P0 and the present sheet P1 does not occur. Thus, the load of the separating roller 164 is normally received, and there is no problem in using the second movement speed V2 between the first sensor 165 and the second sensor 166 for the life determination.

Figure 14:
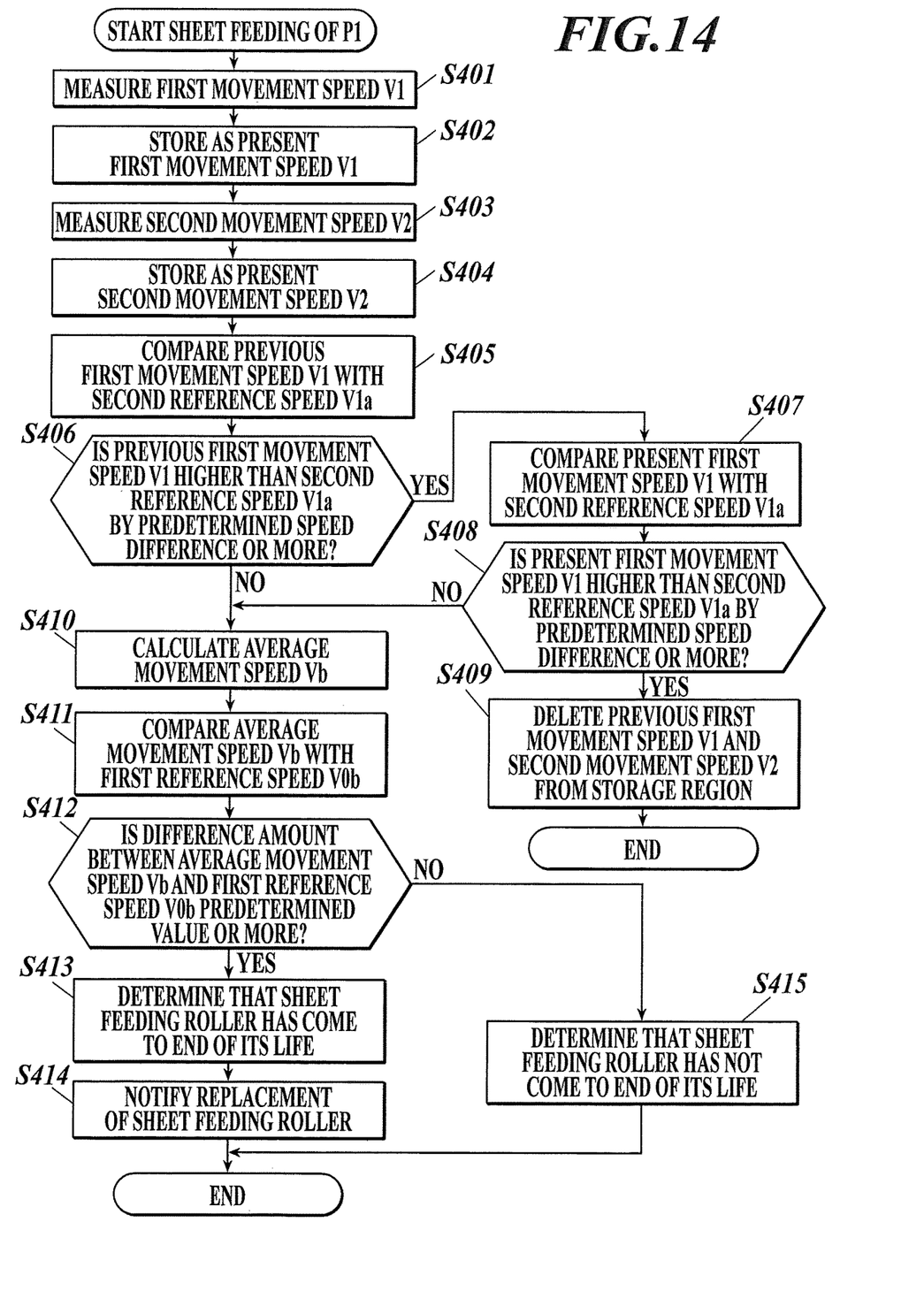
FIG. 14 is a flowchart showing the operation of an image forming apparatus in the second embodiment.

FIG. 14 is a flowchart showing the operation of the image forming apparatus 1 in the embodiment.

The processing in FIG. 14 is achieved by a cooperation between the controller 10 and the program stored in the storage 17.

When the sheet feeding of the present sheet P1 is started, the controller 10 measures the movement speed from the time of sheet feeding start to the detection of the front end of the present sheet P1 by the first sensor 165 (step S401).

The controller 10 then stores the present first movement speed V1 which was measured in step S401 in the temporary storage region (RAM 103 or the like) which is managed by the controller 10 (step S402).

The controller 10 then measures the second movement speed V2 from the detection of the front end of the sheet P1 by the first sensor 165 to the detection of the front end of the sheet P1 by the second sensor 166 (step S403). In detail, the second movement speed V2 is calculated on the basis of the time from the detection of the front end of the sheet P1 by the first sensor 165 to the detection of the front end of the sheet P1 by the second sensor 166, and the distance between the first sensor 165 and the second sensor 166.

The controller 10 stores the second movement speed V2 which was measured in step 403 as the second movement speed V2 of the present sheet P1 in the temporary storage region (RAM 103 or the like) which is managed by the controller 10 (step S404).

The controller 10 compares the previous first movement speed V1 with the second reference speed V1a (step S405).

The controller 10 determines whether or not the previous first movement speed V1 is higher than the second reference speed V1a by the predetermined speed difference or more (step S406). If the controller 10 determines that the previous first movement speed V1 is higher than the second reference speed V1a by the predetermined speed difference or more (step S406; YES), the controller 10 proceeds to step S407. If the controller 10 determines that the previous first movement speed V1 is not higher than the second reference speed V1a by the predetermined speed difference or more (step S406; NO), the controller 10 proceeds to step S410.

In step S407, the controller 10 compares the present first movement speed V1 with the second reference speed V1a.

The controller 10 determines whether or not the present first movement speed V1 is higher than the second reference speed V1a by the predetermined speed difference or more (step S408). If the controller 10 determines that the present first movement speed V1 is higher than the second reference speed V1a by the predetermined speed difference or more (step S408; YES), the controller 10 proceeds to step S409. If the controller 10 determines that the present first movement speed V1 is not higher than the second reference speed V1a by the predetermined speed difference or more (step S408; NO), the controller 10 proceeds to step S410.

In step S409, the controller 10 deletes the previous first movement speed V1 and the previous second movement speed V2 from the storage region, and ends the control.

In step S410, the controller 10 calculates the average movement speed Vb which is the average value of the second movement speeds V2 of the predetermined number of sheets including the previous second movement speed V2.

The controller 10 compares the average movement speed Vb with the first reference speed V0b (step S411).

The controller 10 determines whether or not the difference amount between the average movement speed Vb and the first reference speed V0b is the predetermined value or more as a result of the comparison (step S412). If the controller 10 determines that the difference amount is the predetermined value or more (step S412; YES), the processing proceeds to step S413. However, if the controller 10 determines that the difference amount is not the predetermined value or more (step S412; NO), the processing proceeds to step S415.

In step S413, the controller 10 determines that the sheet feeding roller 163 has come to the end of its life, notifies the user that the replacement time of the sheet feeding roller 163 has come (step S414), and ends the control.

In step S415, the controller 10 determines that the sheet feeding roller 163 has not come to the end of its life, and ends the control.

As described above, the image forming apparatus 1 in the embodiment includes a second sensor 166, detects the movement speed from the start of the sheet feeding to the detection of the front end of the sheet by the first sensor 165 as the first movement speed, and detects the movement speed from the detection of the front end of the sheet by the first sensor 165 to the detection of the front end of the sheet by the second sensor 166 as the second movement speed. The second movement speed of the first sheet is not used for the life determination if the first movement speed of the first sheet (the previous sheet P0 in the embodiment) is higher than the second reference speed by the predetermined speed difference or more, and the first movement speed of the second sheet (the present sheet P1 in the embodiment) is higher than the second reference speed by the predetermined speed difference or more.

Accordingly, since the first movement speeds of two sheets are compared with the second reference speed, it is possible to surely detect the double feeding of the sheet and exclude the movement speed from the target of the life determination. Furthermore, since the life determination is performed by using the second movement speed which is not much influenced by the change in the sheet feeding start position of the sheet due to the double feeding, the reliability of the life determination can be improved more.

The modification examples 1 and 2 can be applied to the second embodiment similarly to the first embodiment.

In the first embodiment and the second embodiment, the life determination of the sheet feeding roller 163 was performed after determining whether or not to use the first movement speed V1 of the previous sheet P0 at the time when the first movement speed V1 of the present sheet P1 was measured. The life determination may be performed after determining whether or not to use the first movement speed V1 of the sheet P0 for the life determination at the time when the first movement speed V1 of the sheet P0 was measured.

In detail, at the time when the first movement speed V1 of the sheet P0 is measured, if the controller 10 determines that the first movement speed V1 of the sheet P0 is higher than the second reference speed V1a of the predetermined number of sheets, which were fed immediately before the sheet P0, by the predetermined speed difference or more (less than the threshold), there is a possibility that the sheet P0 does not receive the load of the separating roller 164 due to the double feeding of the sheet P0. Thus, the first movement speed V1 of the sheet P0 is not used for the life determination. On the other hand, if the controller 10 determines that the first movement speed V1 of the sheet P0 is lower than the predetermined speed difference and the second reference speed V1a of the predetermined number of sheets which were fed immediately before the sheet P0 (less than the threshold), the controller 10 determines that the sheet P0 was conveyed normally and performs the life determination by using the first movement speed V1 of the sheet P0 (for example, the same processing as steps S106 to S111 in FIG. 8, or steps S410 to 415 in FIG. 14).

In this case, since the life determination of the sheet feeding roller 163 can be performed without waiting for the conveyance of the sheet P1, it is possible to more promptly perform the life determination of the sheet feeding roller 163.

Other Embodiments

Though embodiments according to the present invention have been described in detail, the above embodiments are preferable examples of the present invention, and the present invention is not limited to the embodiments.

For example, the embodiments have been described by taking, as an example, a monochrome image forming apparatus which directly transfers the image onto the sheet with the transfer roller from the photoreceptor drum. However, the present invention can also be applied to a color image forming apparatus which primarily transfers the image formed on the photoreceptor drum onto the intermediate transfer roller, and transfers the image onto the sheet with a secondary roller from the intermediate transfer roller.

Though the embodiments have been described by using an electrophotographic image forming apparatus as an example, the sheet feeding device according to the present invention can also be applied to an inkjet image forming apparatus.

The embodiments have been described about the sheet feeder in the image forming apparatus which is configured to be integrated with the image forming apparatus main body. However, the present invention is not limited to this, and a sheet feeding apparatus may be used as a single item. That is, the present invention can also be applied to the sheet feeding apparatus which includes a controller and a sheet feeder and feeds a sheet to a separate image forming apparatus.

In addition, the above description discloses an example using a non-volatile memory, a hard disk or the like as a computer readable medium of the program according to the present invention. However, the present invention is not limited to this example. A portable type storage medium such as a CD-ROM can be applied as other computer readable medium. A carrier wave is also applied as a medium providing the program data according to the present invention via the communication line.

As for the other detailed configurations and the detailed operations of devices forming the image forming apparatus, modifications can be made as needed within the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2018-123790, filed on Jun. 29, 2018, including description, claims, drawings and abstract is incorporated herein by reference in its entirety.

What is claimed is:

1. An image forming apparatus comprising:
a sheet feeding roller which feeds a sheet accumulated on a tray; and
a hardware processor which:
detects a movement speed of the sheet that is currently fed by the sheet feeding roller,
calculates a difference amount between the movement speed and a first reference speed, and
determines a life of the sheet feeding roller based on the difference amount,
wherein the hardware processor determines whether or not to use the movement speed of a predetermined sheet for life determination based on a relationship between the movement speed of the predetermined sheet and the movement speed of a sheet which is fed before the predetermined sheet, and
wherein if the hardware processor determines not to use the movement speed of the predetermined sheet for the life determination, the hardware processor calculates the difference amount by excluding the movement speed of the predetermined sheet.

2. The image forming apparatus according to claim 1, comprising a first sensor which is arranged downstream of the sheet feeding roller in a conveyance direction of the sheet and detects arrival of a front end of the sheet which is fed, wherein the hardware processor determines the life of the sheet feeding roller when a second predetermined sheet which is fed by the sheet feeding roller immediately after the predetermined sheet reaches the first sensor.

3. The image forming apparatus according to claim 1, comprising a first sensor which is arranged downstream of the sheet feeding roller in a conveyance direction of the sheet and detects arrival of a front end of the sheet which is fed, wherein the hardware processor determines the life of the sheet feeding roller when the movement speed of the predetermined sheet is detected.

4. The image forming apparatus according to claim 2, wherein the hardware processor calculates an average value of the movement speed of a predetermined number of sheets which is detected, and determines the life of the sheet feeding roller based on the difference amount between the calculated average value and the first reference speed.

5. The image forming apparatus according to claim 2, wherein the hardware processor detects, as a first movement speed, the movement speed from start of sheet feeding of the sheet by the sheet feeding roller to detection of the front end of the sheet by the first sensor.

6. The image forming apparatus according to claim 5, wherein the hardware processor determines not to use the first movement speed of the predetermined sheet for the life determination if the first movement speed of the predetermined sheet is higher than a second reference speed by a predetermined speed difference or more.

7. The image forming apparatus according to claim 2, comprising a second sensor which is arranged downstream of the first sensor in the conveyance direction of the sheet and detects arrival of the front end of the sheet which is fed, wherein
the first sensor is arranged at a position which is downstream of the sheet feeding roller in the conveyance direction of the sheet and at which a distance from the sheet feeding roller is shorter than a length of the sheet in the conveyance direction,
the hardware processor detects, as a first movement speed, the movement speed from start of sheet feeding of the sheet by the sheet feeding roller to detection of the front end of the sheet by the first sensor, and
the hardware processor detects, as a second movement speed, the movement speed from the detection of the front end of the sheet by the first sensor to detection of the front end of the sheet by the second sensor.

8. The image forming apparatus according to claim 7, wherein the hardware processor determines not to use the second movement speed of the predetermined sheet for the life determination if the first movement speed of the predetermined sheet is higher than a second reference speed by a predetermined speed difference or more and the first movement speed of the second predetermined sheet which is fed by the sheet feeding roller immediately after the predetermined sheet is higher than the second reference speed by a predetermined speed difference or more.

9. The image forming apparatus according to claim 8, wherein the second reference speed is an average value of the movement speed of a predetermined number of sheets.

10. The image forming apparatus according to claim 2, wherein the first reference speed is a value which is set in advance.

11. The image forming apparatus according to claim 2, wherein the hardware processor determines the life of the sheet feeding roller when the predetermined sheet reaches the first sensor if the predetermined sheet is a last sheet among the sheet accumulated on the tray.

12. The image forming apparatus according to claim 2, wherein the hardware processor determines not to use the movement speed of the predetermined sheet for the life determination if the tray is detected being opened during sheet feeding of the second predetermined sheet which is fed by the sheet feeding roller immediately after the predetermined sheet.

13. The image forming apparatus according to claim 12, wherein
the hardware processor calculates an average value of the movement speed of a predetermined number of sheets which is detected and stores the average value in a storage, and
if the tray is detected being opened during the sheet feeding of the second predetermined sheet which is fed by the sheet feeding roller immediately after the predetermined sheet, the hardware processor deletes the average value which is stored in the storage.

14. The image forming apparatus according to claim 3, wherein the hardware processor calculates an average value of the movement speed of a predetermined number of sheets which is detected, and determines the life of the sheet feeding roller based on the difference amount between the calculated average value and the first reference speed.

15. The image forming apparatus according to claim 3, wherein the hardware processor detects, as a first movement speed, the movement speed from start of sheet feeding of the sheet by the sheet feeding roller to detection of the front end of the sheet by the first sensor.

16. The image forming apparatus according to claim 15, wherein the hardware processor determines not to use the first movement speed of the predetermined sheet for the life determination if the first movement speed of the predetermined sheet is higher than a second reference speed by a predetermined speed difference or more.

17. The image forming apparatus according to claim 3, comprising a second sensor which is arranged downstream of the first sensor in the conveyance direction of the sheet and detects arrival of the front end of the sheet which is fed, wherein
the first sensor is arranged at a position which is downstream of the sheet feeding roller in the conveyance direction of the sheet and at which a distance from the sheet feeding roller is shorter than a length of the sheet in the conveyance direction,
the hardware processor detects, as a first movement speed, the movement speed from start of sheet feeding of the sheet by the sheet feeding roller to detection of the front end of the sheet by the first sensor, and
the hardware processor detects, as a second movement speed, the movement speed from the detection of the front end of the sheet by the first sensor to detection of the front end of the sheet by the second sensor.

18. The image forming apparatus according to claim 17, wherein the hardware processor determines not to use the second movement speed of the predetermined sheet for the life determination if the first movement speed of the predetermined sheet is higher than a second reference speed by a predetermined speed difference or more and the first movement speed of a second predetermined sheet which is fed by the sheet feeding roller immediately after the predetermined sheet is higher than the second reference speed by a predetermined speed difference or more.

19. The image forming apparatus according to claim 18, wherein the second reference speed is an average value of the movement speed of a predetermined number of sheets.

20. The image forming apparatus according to claim 3, wherein the first reference speed is a value which is set in advance.

21. The image forming apparatus according to claim 3, wherein the hardware processor determines the life of the sheet feeding roller when the predetermined sheet reaches the first sensor if the predetermined sheet is a last sheet among the sheet accumulated on the tray.

22. The image forming apparatus according to claim 3, wherein the hardware processor determines not to use the movement speed of the predetermined sheet for the life determination if the tray is detected being opened during sheet feeding of a second predetermined sheet which is fed by the sheet feeding roller immediately after the predetermined sheet.

23. The image forming apparatus according to claim 22, wherein
the hardware processor calculates an average value of the movement speed of a predetermined number of sheets which is detected and stores the average value in a storage, and
if the tray is detected being opened during the sheet feeding of the second predetermined sheet which is fed by the sheet feeding roller immediately after the predetermined sheet, the hardware processor deletes the average value which is stored in the storage.

24. A non-transitory computer readable storage medium storing a program causing a computer of an image forming apparatus, which includes a sheet feeding roller that feeds a sheet accumulated on a tray, to perform:
detecting a movement speed of the sheet that is currently fed by the sheet feeding roller;
calculating a difference amount between the movement speed and a first reference speed;
determining a life of the sheet feeding roller based on the difference amount;
determining whether or not to use the movement speed of a predetermined sheet for life determination based on a relationship between the movement speed of the predetermined sheet and the movement speed of a sheet which is fed before the predetermined sheet; and
calculating the difference amount by excluding the movement speed of the predetermined sheet if the movement speed of the predetermined sheet is determined not to be used for the life determination.

25. A life determination method for determining a life of a sheet feeding roller which feeds a sheet accumulated on a tray, the method comprising:
speed detecting of detecting a movement speed of the sheet that is currently fed by the sheet feeding roller; and
life determining of calculating a difference amount between the movement speed and a first reference speed, and determining a life of the sheet feeding roller based on the difference amount, wherein
in the life determining, whether or not to use the movement speed of a predetermined sheet for life determination is determined based on a relationship between the movement speed of the predetermined sheet and the movement speed of a sheet which is fed before the predetermined sheet, and if the movement speed of the predetermined sheet is determined not to be used for the life determination, the difference amount is calculated by excluding the movement speed of the predetermined sheet.

* * * * *